United States Patent
Naruko et al.

(10) Patent No.: US 12,483,267 B2
(45) Date of Patent: Nov. 25, 2025

(54) DATA COMPRESSION SYSTEM AND DATA COMPRESSION METHOD

(71) Applicant: HITACHI, LTD., Tokyo (JP)

(72) Inventors: Takahiro Naruko, Tokyo (JP); Hiroaki Akutsu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 422 days.

(21) Appl. No.: 18/156,493

(22) Filed: Jan. 19, 2023

(65) Prior Publication Data

US 2023/0268931 A1 Aug. 24, 2023

(30) Foreign Application Priority Data

Feb. 18, 2022 (JP) ................................ 2022-023881

(51) Int. Cl.
*H03M 7/30* (2006.01)
(52) U.S. Cl.
CPC ................................. *H03M 7/3059* (2013.01)
(58) Field of Classification Search
None
See application file for complete search history.

(56) References Cited

U.S. PATENT DOCUMENTS

| | | | | |
|---|---|---|---|---|
| 2007/0174536 A1* | 7/2007 | Nakagawa | ............... | G06F 3/067 711/2 |
| 2019/0251418 A1* | 8/2019 | Nakanishi | ............... | G06N 3/045 |
| 2021/0049461 A1* | 2/2021 | Takeshima | ............. | G16H 30/40 |
| 2021/0406769 A1* | 12/2021 | Sato | ................... | H03M 7/3059 |

FOREIGN PATENT DOCUMENTS

| | | | | | |
|---|---|---|---|---|---|
| CN | 111918062 | A * | 11/2020 | ........... | H04N 19/184 |
| CN | 114095775 | A * | 2/2022 | ............ | H04L 69/04 |
| JP | 07184062 | A * | 7/1995 | | |
| JP | 2002369220 | A * | 12/2002 | | |
| JP | 2004015226 | A * | 1/2004 | | |
| JP | 2006060490 | A * | 3/2006 | | |
| JP | 2007-199891 | A | 8/2007 | | |
| JP | 4717860 | B2 * | 7/2011 | ............ | G06N 3/048 |
| KR | 20040018414 | A * | 3/2004 | ........... | H04N 19/172 |
| KR | 20220015556 | A * | 2/2022 | ......... | H04N 21/4331 |
| WO | WO-2009025347 | A1 * | 2/2009 | ............ | G06T 9/002 |

OTHER PUBLICATIONS

Hu, Z., et al., FVC: A New Framework towards Deep Video Compression in Feature Space, Proceedings of the IEEE/CVF Conference on Computer Vision and Pattern Recognition (CVPR), pp. 1502-1511 (2021).

Ma, H., et al., Improving Compression Artifact Reduction via End-to-End Learning of Side Information, Proceedings of the 2020 IEEE International Conference on Visual Communications and Image Processing (VCIP), pp. 403-406 (2020).

Notice of Reasons for Refusal, issued Mar. 18, 2025, for Japanese Application No. 2022-023881 (with English translation).

* cited by examiner

*Primary Examiner* — Ted W Barnes
(74) *Attorney, Agent, or Firm* — Baker Botts L.L.P.

(57) ABSTRACT

A data compression system compresses original data by a first lossy compression method to generate first compressed data, decompresses the first compressed data to generate first decompressed data, extracts residual information between the original data and the first decompressed data, compresses the residual information by a second lossy compression method different from the first lossy compression method to generate second compressed data, and stores the first compressed data and the second compressed data in the one or more storage devices.

13 Claims, 11 Drawing Sheets

DATA COMPRESSION SYSTEM AND DATA COMPRESSION METHOD

CLAIM OF PRIORITY

The present application claims priority from Japanese patent application JP2022-023881 filed on Feb. 18, 2022, the content of which is hereby incorporated by reference into this application.

BACKGROUND OF THE INVENTION

1. Field of the Invention

The present invention relates to reduction of a data amount.

2. Description of the Related Art

A storage system that reduces a data amount has been known (for example, JP 2007-199891 A). This kind of storage system generally reduces the data amount through compression. As one of existing compression methods, a method for dictionarizing a character string having a high appearance frequency in a predetermined block unit and replacing the character string with a code having a smaller size, such as a run-length method, has been known.

A lossy compression technique has been known as a technique for reducing the data amount as compared with lossless compression such as a run-length method. For example, High Efficiency Video Coding (HEVC) and Versatile Video Coding (VVC) which are standardized compression techniques have been known for moving image data (hereinafter, standard codecs).

Furthermore, as a technique (deep video compression) for reducing the data amount of a moving image by a compressor and a decompressor constructed by a deep neural network (DNN), for example, there is Zhihao Hu, Guo Lu, Dong Xu, "FVC: A New Framework Towards Deep Video Compression in Feature Space", CVPR 2021.

Zhihao Hu, Guo Lu, Dong Xu, "FVC: A New Framework Towards Deep Video Compression in Feature Space", CVPR 2021.

SUMMARY OF THE INVENTION

From the viewpoint of reducing cost required for data storage, transfer, and the like, it is considered that lossy compression having a high compression rate is required for storage, transfer, and the like of large-scale data generated by Internet of things (IoT) devices and the like.

However, since an optimum lossy compression technique is different for each part of data, there is a problem that the compression rate is not optimum only in a case where a single compression technique is used. For example, in intra-frame encoding of moving image compression, which compression rate is better between the standard codec and the deep video compression may be different for each spatial region of each frame.

This problem is not limited to the standard codec and the deep video compression in the moving image data, and may occur in two or more kinds of compression techniques of various kinds of data.

A data compression system according to an aspect of the present invention includes one or more processors and one or more storage devices. The one or more processors are configured to compress original data by a first lossy compression method to generate first compressed data, decompress the first compressed data to generate first decompressed data, extract residual information between the original data and the first decompressed data, compress the residual information by a second lossy compression method different from the first lossy compression method to generate second compressed data, and store the first compressed data and the second compressed data in the one or more storage devices.

According to one aspect of the present invention, since an appropriate compression technique is selectively used for each part of data, the compression rate is improved as compared with a case where only a single compression technique is used.

DESCRIPTION OF THE PREFERRED EMBODIMENTS

Next, an embodiment of the present specification will be described with reference to the drawings. Note that the present invention is not limited to the embodiment to be described below.

First Embodiment

(1-1) Outline

Figure 1:
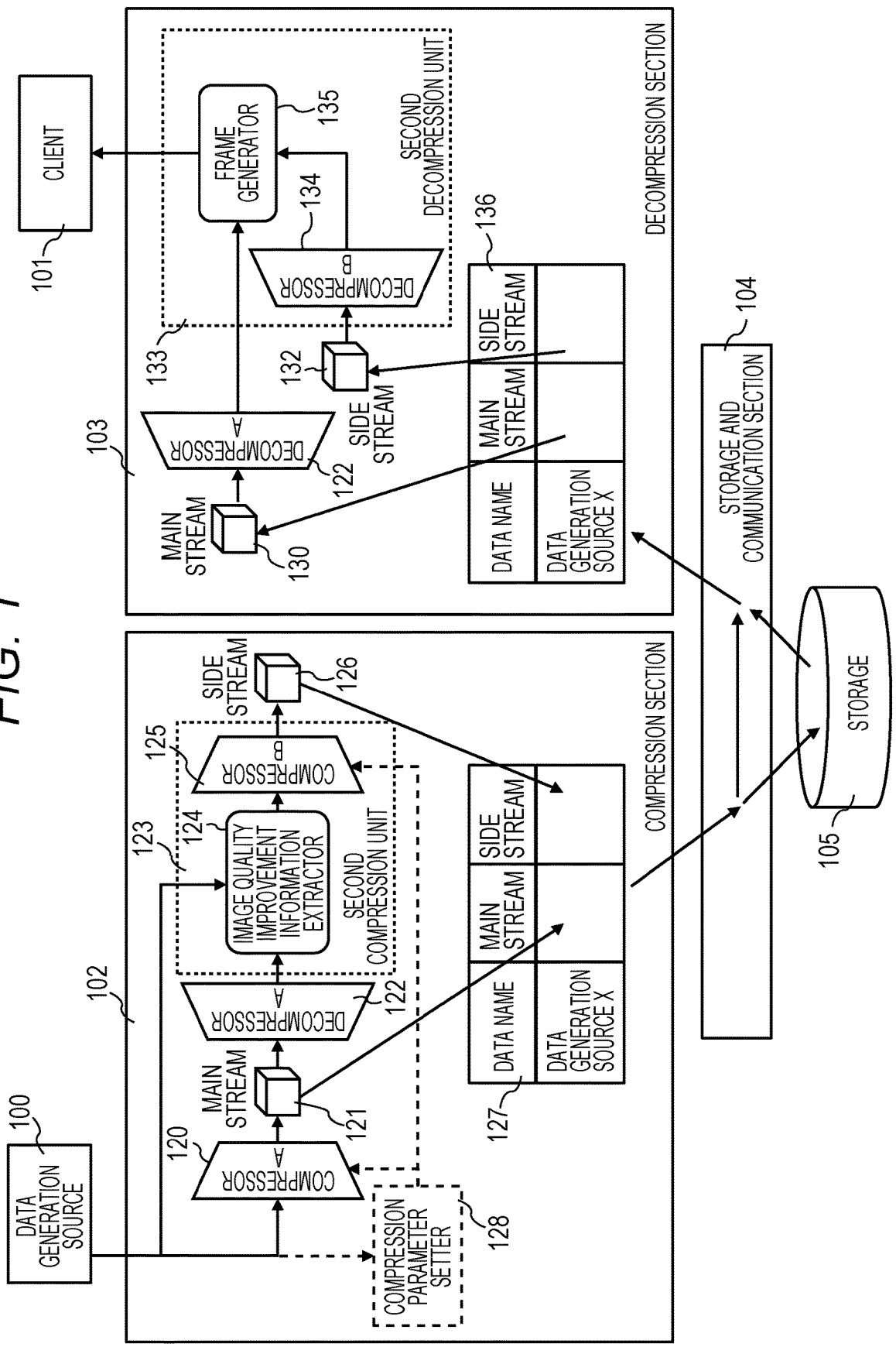
FIG. 1 is an outline of a first embodiment.

First, an outline of a first embodiment will be described with reference to FIG. 1. FIG. 1 illustrates a logical configuration of a system. The system includes a data generation source 100, a client 101, a compression section 102, a decompression section 103, a storage and communication section 104, and a storage 105.

The data generation source 100 is a main constituent that generates data to be compressed, and is, for example, an image sensor that generates moving image data. In the present embodiment, a case where the data generation source 100 is the image sensor that generates the moving image data will be described as an example. However, the data generation source 100 and the data generated by the data generation source are not limited thereto, and may be, for example, an image sensor that generates still image data, a vibration sensor that generates one-dimensional time-series data, or the like.

Furthermore, the data generation source 100 is not limited to the sensor, and may be software such as computer graphics that generates moving image data or still image data. Furthermore, the data generation source 100 may be, for example, data obtained by processing data generated by a sensor, software, or the like, such as a segmentation map obtained by performing semantic segmentation on each frame of moving image data. Furthermore, a plurality of data generation sources 100 may be provided.

The compression section 102 is a module that compresses the data generated by the data generation source 100. Upon receiving the moving image data to be compressed, the compression section 102 inputs a frame (hereinafter, original frame) of the data to a compressor 120 (hereinafter, compressor A) of a first compression technique, and obtains a main stream 121 which is compressed data obtained as an output thereof. The first compression technique is a lossy compression technique. At this time, the main stream is generated to achieve less bit consumption amount than in a case where compression is performed to obtain a desired image quality by using only the first compression technique. The bit consumption amount represents a size of compressed data, and the smaller a value thereof, the higher a compression rate.

The bit consumption amount may be reduced by any method. For example, the bit consumption amount may be reduced by uniformly increasing a quantization parameter (hereinafter, QP) in the entire frame, or the bit consumption amount may be reduced by comparing compression rates of the first compression technique and a second compression technique for each region in the frame and increasing the QP in a region where the compression rate of the second compression technique is good. The second compression technique is a lossy compression technique.

A compression parameter setter 128 is a block that determines parameters of a compressor A120 and/or a compressor B125 in the compression section 102. For example, the compression parameter setter 128 can reduce the bit consumption amount by the compressor A120 in the entire frame by setting, as a parameter of the compressor A120, a QP obtained by adding a constant to a QP designated by a user.

Alternatively, for example, the compression parameter setter 128 may set the parameter of the compressor A120 to increase the QP of the compressor A120 in a region where a compression rate of the compressor B125 is good based on a compression rate measured by actually compressing each patch obtained by dividing the original frame into tiles by the compressor A120 and the compressor B125. Alternatively, for example, the compression parameter setter 128 may output a parameter that achieves an image quality designated by the user based on a relationship between a bit consumption amount and an image quality measured in advance.

Furthermore, for example, in a case where the compressor B125 to be described later is a compressor constructed by a neural network trained for each parameter of the compressor A120, the compression parameter setter 128 may set a trained parameter of the neural network of the compressor B125 corresponding to the parameter of the compressor A120.

However, the compression parameter setter 128 is not limited thereto. Furthermore, in a case where the parameters of the compressor A120 and the compressor B125 are fixed values or in a case where the user is allowed to designate the parameters, the compression parameter setter 128 may not be provided.

Subsequently, the compression section 102 inputs the main stream 121 to a decompressor 122 of the first compression technique (hereinafter, decompressor A) to obtain a decompressed frame (hereinafter, first decompressed frame). Subsequently, the compression section 102 inputs the original frame and the first decompressed frame to a second compression unit 123, and obtains a side stream 126 which is compressed data obtained as an output thereof.

At this time, the bit consumption amount of the side stream is controlled to improve an image quality of a region where the compression rate of the second compression technique is good with respect to the first compression technique. The control method may be any method, and for example, the bit consumption amount can be controlled by a deep neural network (DNN) as will be described later. Alternatively, as described above, the bit consumption amount can be controlled by the compression parameter setter 128.

The second compression unit 123 includes an image quality improvement information extractor 124 and a compressor 125 of the second compression technique (hereinafter, compressor B). The image quality improvement information extractor 124 receives, as inputs, the original frame and the first decompressed frame, and outputs data in a format that can be compressed by the compressor B125. For example, the image quality improvement information extractor 124 outputs a new frame representing a residual between the original frame and the first decompressed frame by subtracting the first decompressed frame from the original frame for each element. The output of the image quality improvement information extractor 124 is compressed to the side stream by the compressor B125.

However, the image quality improvement information extractor 124 is not limited thereto, and may be, for example, a block that outputs a frame obtained by dividing the original frame by the first decompressed frame for each element, or may be a block constructed by any other calculatable processing. Furthermore, the second compression unit 123 does not need to include the image quality improvement information extractor 124 and the compressor B125 independent of each other, and may be one functional block including functions of both thereof. For example, as will be described later, the second compression unit 123 may be one set of DNNs that receives, as inputs, the original frame and the first decompressed frame and outputs the side stream 126.

Furthermore, the blocks included in second compression unit 123 are not limited to the image quality improvement information extractor 124 and the compressor B125, but may include other functional blocks. For example, a block that outputs setting information of the compressor B125 from the original frame and the first decompressed frame may be included.

Finally, the compression section 102 associates the main stream 121 and the side stream 126 by a compressed data management table 127. The compression section 102 transmits the main stream and the side stream as final compressed data to the storage and communication section 104.

The storage and communication section 104 is a module that stores the data received from the compression section 102 in the storage 105, transfers the data to the decompression section 103, and responds the compressed data stored in the storage 105 to the decompression section 103 in response to a request from the decompression section 103.

The decompression section 103 is a module that decompresses the compressed data acquired from the storage and communication section 104 and responds the compressed data in response to a request from the client 101.

The client 101 may be a computer different from a computer that processes the decompression section 103, may be software such as moving image display software or moving image analysis software that operates on the same computer as the decompression section 103, or may be any other hardware and software that consumes the decompressed data. The client 101 may request the decompression section 103 for data for each frame, for data for each moving image, for data generated by the data generation source 100 to be transmitted at any time, or for data under any other conditions.

Upon receiving the compressed data from the storage and communication section 104, the decompression section 103 acquires a main stream 130 and a side stream 132 from a compressed data management table 136 constituting the data. Subsequently, the main stream is input to the decompressor A122 to obtain the first decompressed frame. Subsequently, the side stream 132 and the first decompressed frame are input to a second decompression unit 133 to obtain a final decompressed frame (hereinafter, last decompressed frame), and the final decompressed frame is responded to the client 101.

The second decompression unit 133 includes a decompressor 134 of the second compression technique (hereinafter, decompressor B) and a frame generator 135. The frame generator 135 is a block that receives, as inputs, an output of the compressor B134 and the first decompressed frame to obtain the last decompressed frame. For example, in a case where the image quality improvement information extractor 124 outputs the residual between the original frame and the first decompressed frame, the corresponding frame generator 135 can perform processing of adding the outputs of the first decompressed frame and the decompressor B134.

However, the frame generator 135 is not limited thereto, and may be a block constructed by any calculatable processing. Furthermore, the frame generator 135 is not limited to inverse conversion processing of the image quality improvement information extractor 124.

Furthermore, the second decompression unit 133 does not need to include the decompressor B134 and the frame generator 135 independent of each other, and may be one functional block including functions of both thereof. For example, as will be described later, the second decompression unit 133 may be one set of DNNs that receives, as inputs, the first decompressed frame and the side stream 132 and outputs the last decompressed frame. Furthermore, the blocks included in the second decompression unit 133 are not limited to the decompressor B134 and the frame generator 135, and may include other functional blocks.

The processing of the compression section 102 and the decompression section 103 described above may be performed for each frame of the moving image, or may be performed for each unit in which a plurality of frames is collected. In a case where processing is performed for each unit in which the plurality of frames together, the first compression technique, the second compression technique, or both thereof may perform encoding in consideration of redundancy in a time direction, such as inter-frame encoding in moving image compression.

(1-2) System Configuration

A system configuration of the first embodiment will be described with reference to FIG. 2. The compression section 102, the decompression section 103, and the storage and communication section 104 are, for example, computers including hardware resources such as a processor, a memory, and a network interface, and software resources such as an operating system, middleware, a data compression program, and a data decompression program. A switch 206 interconnects the compression section 102, the decompression section 103, and the storage and communication section 104.

The compression section 102 includes a front-end interface 220, a processor 221, a RAM 223, a back-end interface 226, and a switch 222. The front-end interface 220 is an interface for connecting the compression section 102 and the data generation source 100. The processor 221 controls the entire compression section 102 based on a program 224 stored in the RAM 223 and management information (metadata) 225 via the switch 222. The back-end interface 226 connects the compression section 102 and the storage and communication section 104.

The decompression section 103 includes a front-end interface 230, a processor 231, a RAM 233, a back-end interface 236, and a switch 232. The front-end interface 230 is an interface for connecting the decompression section 103 and the client 101. The processor 231 controls the entire decompression section 103 based on a program 234 stored in the RAM 233 and management information (metadata) 235 via the switch 232. The back-end interface 236 connects the decompression section 103 and the storage and communication section 104.

Figure 2:
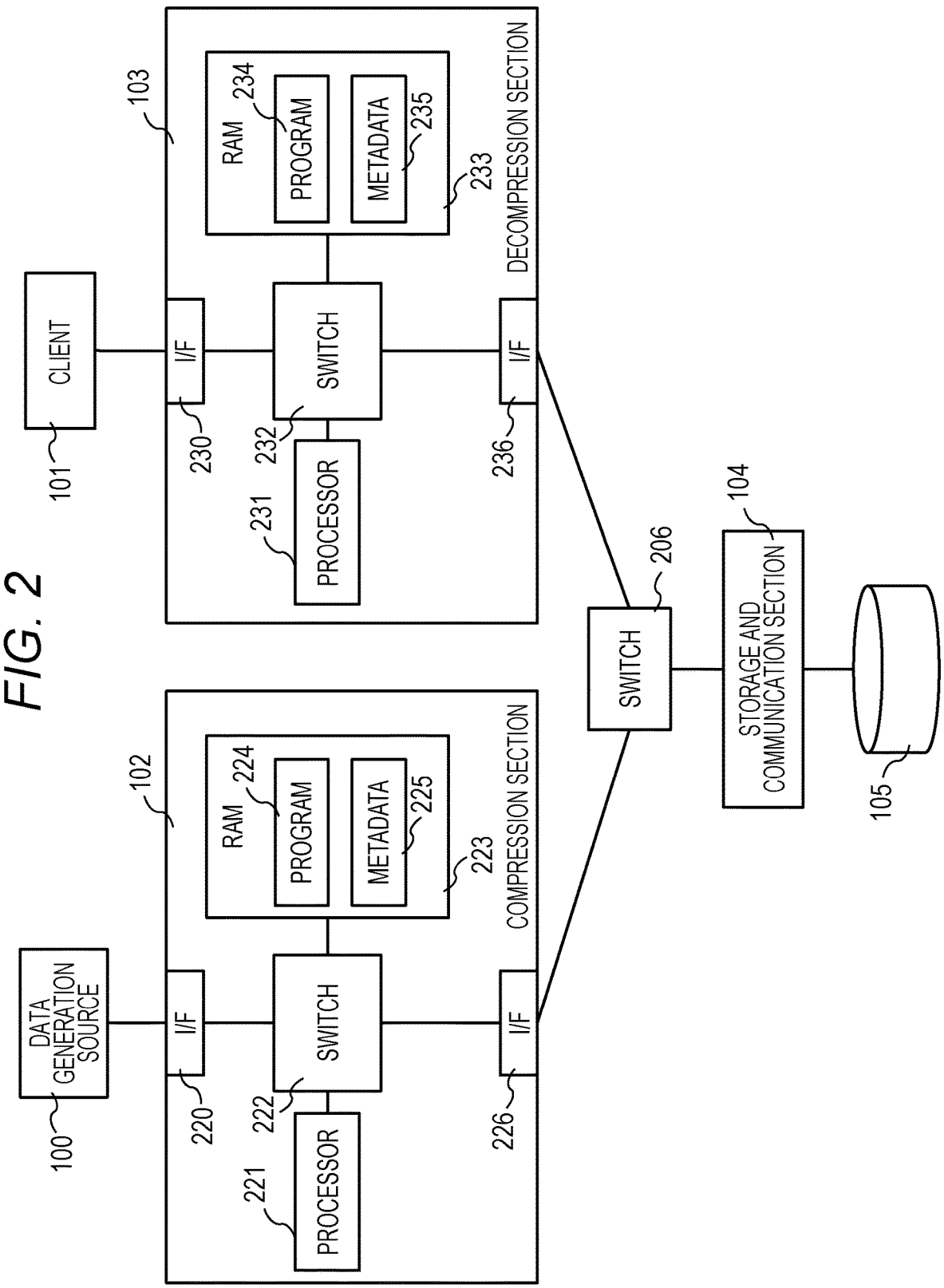
FIG. 2 is a system configuration diagram according to the first embodiment.

Although the detailed configuration of the storage and communication section 104 is omitted in FIG. 2, for example, the storage and communication section can have a configuration similar to the compression section 102 or the decompression section 103.

In addition to a general-purpose arithmetic processor such as a central processing unit (CPU), the processors 221 and 231 may be accelerators such as a graphical processing unit (GPU) and a field programmable gate array (FPGA), may be a hardware encoder and decoder of a standard codec such as HEVC, or may be a combination thereof.

The storage 105 may be a block device constructed by a hard disk drive (HDD) or a solid state drive (SSD), may be a file storage, may be a content storage, may be a volume constructed on a storage system, or may be realized by any method of storing data by using one or more storage devices.

The compression section 102, the decompression section 103, and the storage and communication section 104 may have a configuration in which hardware such as an integrated circuit (IC) on which the above-described components are mounted is connected to each other, or may have a configuration in which some of the components are mounted by one semiconductor element as an application specific integrated circuit (ASIC) or an FPGA, or may be a virtual machine (VM) in which these components are mounted in software. Furthermore, components other than the components shown here may be added.

Furthermore, the data generation source 100, the client 101, the compression section 102, the decompression section 103, and the storage and communication section 104 may be different hardware devices, may be different VMs that operate on the same computer, may be different containers that operate on the same operating system (OS), may be different applications that operate on the same OS, may be each constructed by a plurality of computers, or may be a combination thereof.

For example, the data generation source 100 may be an image sensor, the compression section 102 may be an edge device connected to the image sensor and constructed by a CPU and a GPU, the client 101 and the decompression section 103 may be programs that operate on the same PC, and the storage and communication section 104 may be a program that operates on hyper converged infrastructure.

(1-3) RAM Configuration

Figure 3:
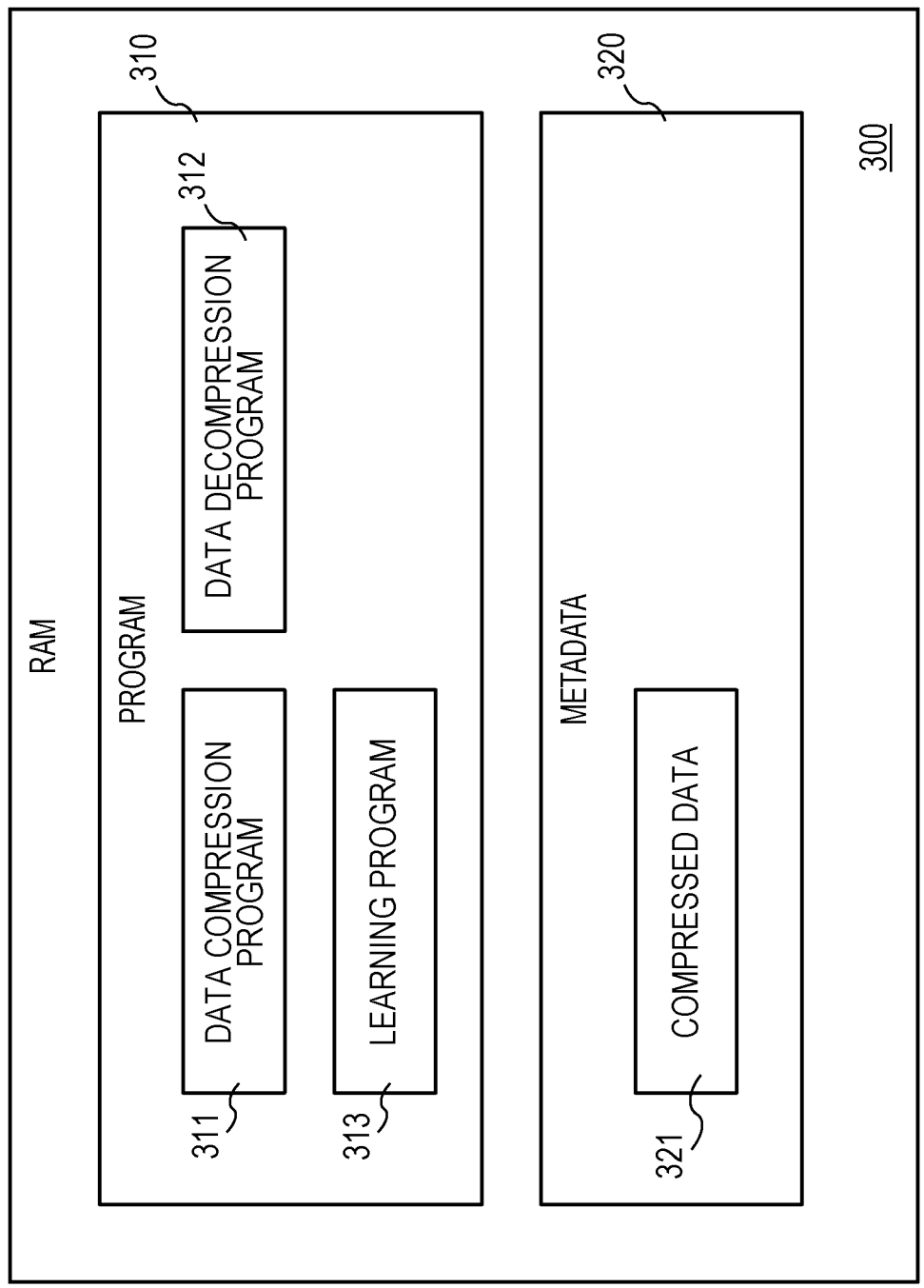
FIG. 3 illustrates a memory configuration according to the first embodiment.

FIG. 3 illustrates a configuration 300 of data stored in the RAM 223 of the compression section 102 and the RAM 233 of the decompression section 103. The RAM stores a program 310 executed by the processor and management information 320 used in the program.

The program 310 includes a data compression program 311, a data decompression program 312, and a learning program 313. The management information 320 includes compressed data 321. Note that the program 224 of the compression section 102 may not include the data decompression program 312, and the program 234 of the decompression section 103 may not include the data compression program 311.

Furthermore, in a case where the learning of the DNN is executed by a third computer not included in the system illustrated in FIG. 2, the learning program 313 may not be included in the compression section 102 or the decompression section 103. However, in this case, the learning program 313 is loaded onto the RAM of the third computer. Note that the RAM may include data other than the above-described program and configuration information.

The data compression program 311 is a program for compressing data in the compression section 102. The data decompression program 312 is a program for decompressing compressed data in the decompression section 103. The learning program 313 is a program that executes learning in a case where the DNN is included in the compression section 102 and the decompression section 103.

The compressed data 321 is a memory region for storing compressed data, and has a data structure including a main stream and a side stream.

(1-4) Table Configuration

Figure 4:
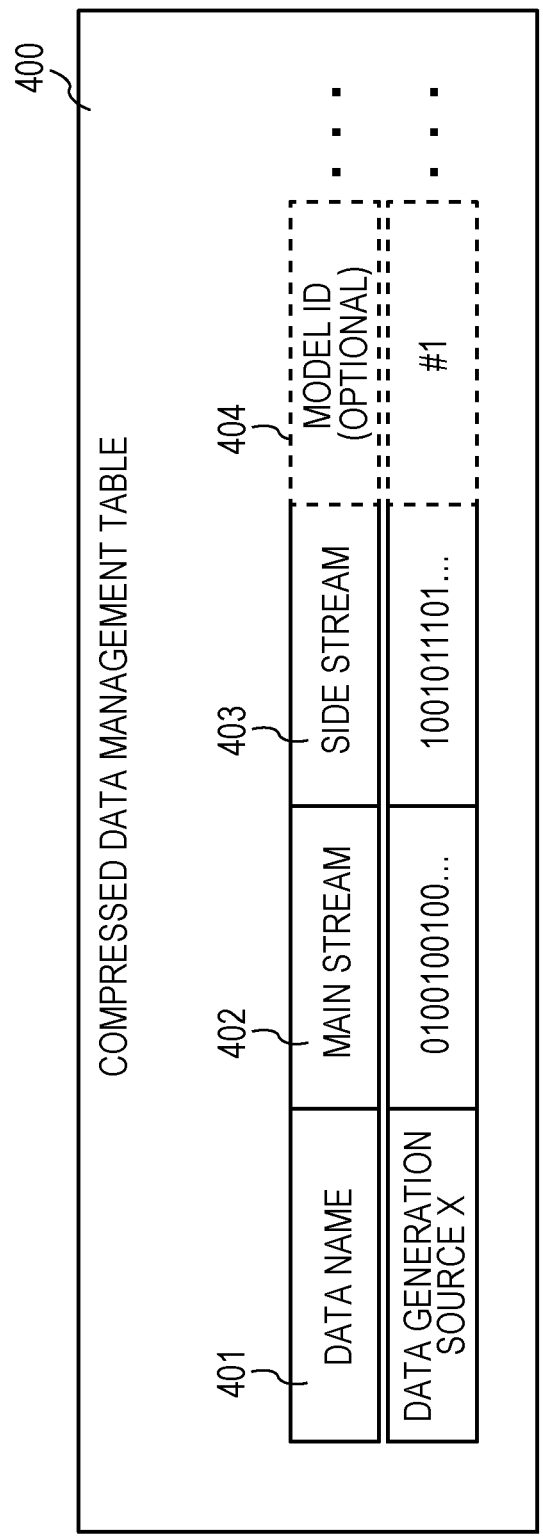
FIG. 4 is a compressed data management table according to the first embodiment.

FIG. 4 illustrates a compressed data management table 400 which is a data structure constituting the compressed data 321. Note that the method of expressing the compressed data 321 is not limited to the format of the compressed data management table 400, and may be expressed by a data structure other than a table, such as extensible markup language (XML), YAML Ain't a Markup Language (YAML), a hash table, or a tree structure.

A data name column 401 of the compressed data management table 400 is a field for storing an identifier representing the data generation source 100. The identifier may be a character string named by the user for the data generation source 100, may be a media access control (MAC) address or an Internet Protocol (IP) address allocated to the data generation source 100, or may be any other code that can identify the data generation source 100. Furthermore, in a case where the data generation source 100 is obvious, the data name column 401 may not be present.

A main stream column 402 is a field for storing the main stream 121 obtained by compressing the data received from the data generation source 100 by the compressor A120. A side stream column 403 is a field for storing the side stream 126 which is an output of the second compression unit 123.

A model ID column 404 is a field for storing information for identifying a model used for generating the side stream, for example, in a case where the second compression technique is deep video compression and a plurality of models is prepared for each target image quality. However, the model ID column 404 is optional and may not be included in the compressed data management table 400. Furthermore, fields other than the fields described above, such as setting information of the first compression technique and a time stamp, may be included in the compressed data management table 400.

(1-5) Data Compression Processing and Data Decompression Processing

Figure 5:
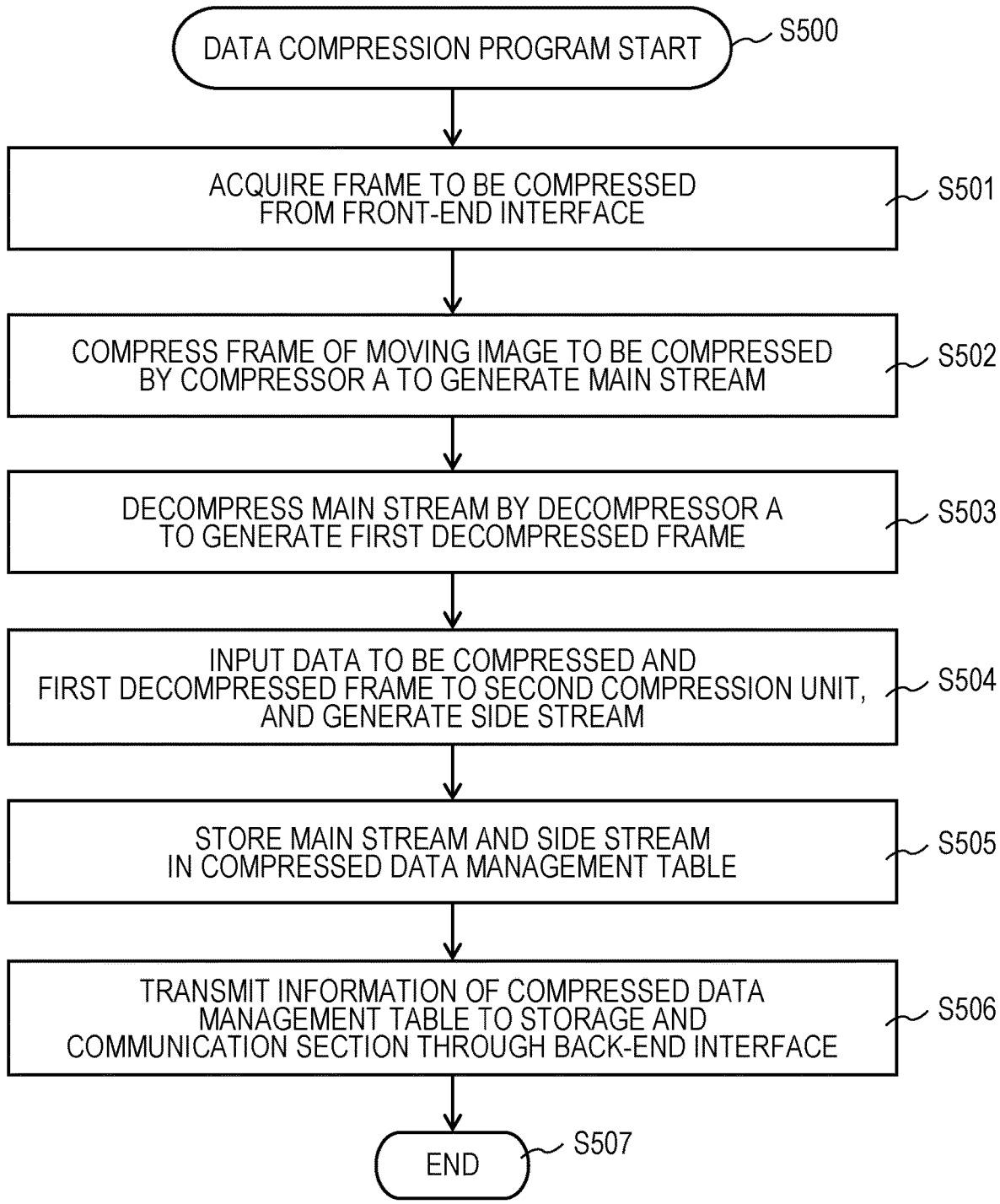
FIG. 5 is a flowchart of a data compression program according to the first embodiment.

FIG. 5 is a flowchart of the data compression program 311. The processor 221 of the compression section 102 starts the data compression program 311 upon receiving the moving image data generated by the data generation source 100 (S500).

Step S501 is a step of acquiring, by the processor 221, one or more frames of a moving image received from the data generation source 100 by the compression section 102 from the front-end interface 220.

Step S502 is a step of compressing, by the processor 221, the frame acquired in step S501 by the compressor A120 to generate the main stream 121.

Step S503 is a step of inputting, by the processor 221, the main stream 121 generated in step S501 to the decompressor A122 to generate the first decompressed frame.

Step S504 is a step of generating, by the processor 221, the side stream 126 by using, as inputs to the second compression unit 123, the frame acquired in step S501 and the first decompressed frame generated in step S502.

Step S505 is a step of storing the main stream 121 generated in step S502 and the side stream 126 generated in step S504 in the compressed data management table 400 in the compressed data 321. Information such as the data name column 401 and the model ID column 404 is also set in this step if necessary.

Step S506 is a step of transmitting the information of the compressed data management table 400 created in step S505 to the storage and communication section 104 through the back-end interface 226. Thereafter, the data compression program 311 is ended (S507).

Figure 6:
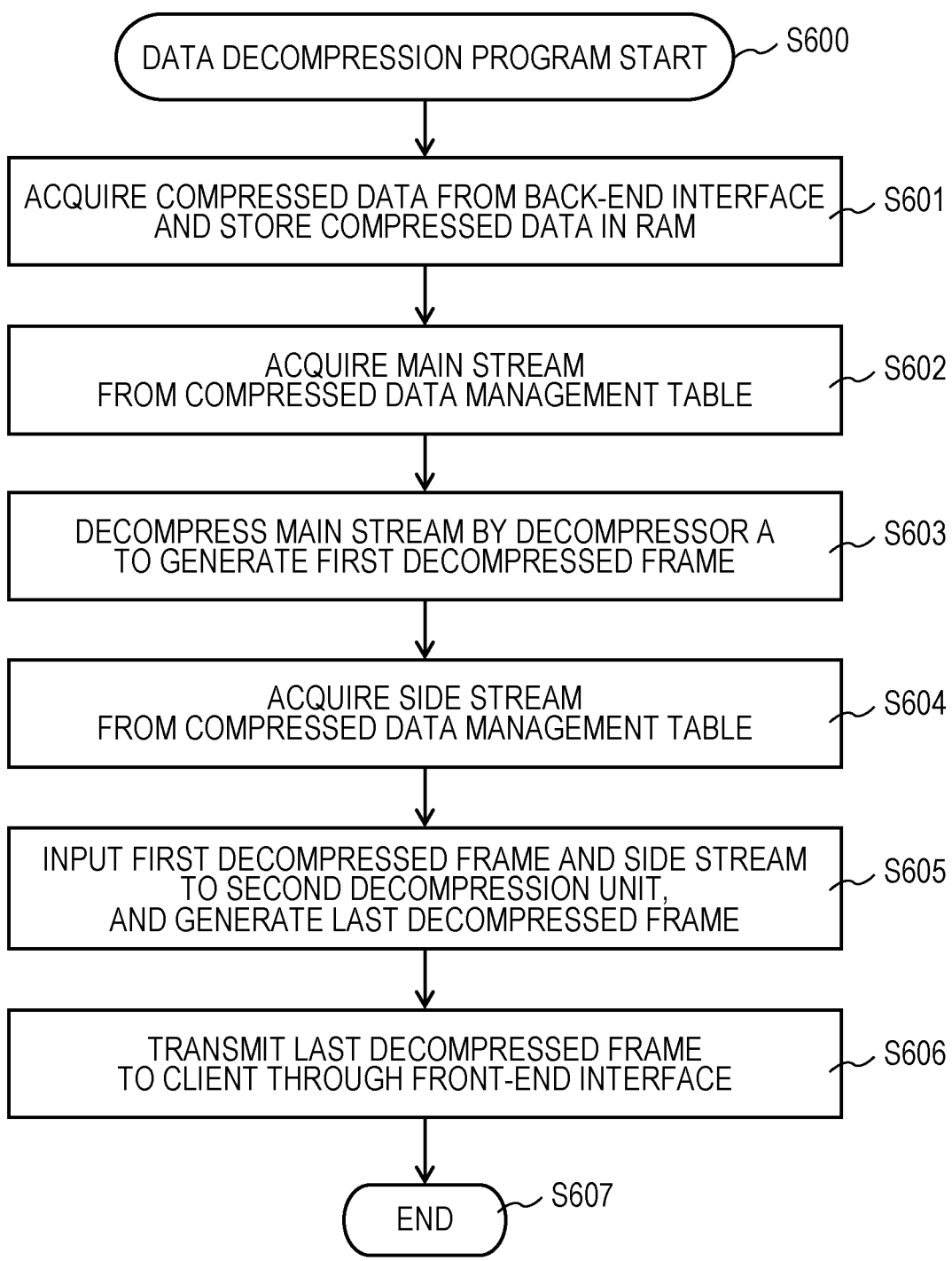
FIG. 6 is a flowchart of a data decompression program according to the first embodiment.

FIG. 6 is a flowchart of the data decompression program 312. The processor 231 of the decompression section 103 starts the data decompression program 312 upon receiving the compressed data from the storage and communication section 104 (S600).

Step S601 is a step of acquiring, by the processor 231, the compressed data received from the storage and communication section 104 by the decompression section 103 from the back-end interface 236 and storing the compressed data in a compressed data 321 of the RAM 233 in the form of the compressed data management table 400.

Step S602 is a step of acquiring, by the processor 231, the main stream 130 from the compressed data management table 400 in the compressed data 321.

Step S603 is a step of decompressing, by the processor 231, the main stream 130 acquired in step S602 into the first decompressed frame by the decompressor A122.

Step S604 is a step of acquiring, by the processor 231, the side stream 132 from the compressed data management table 400.

Step S605 is a step of inputting, by the processor 231, the first decompressed frame generated in step S603 and the side stream acquired in step S604 to the second decompression unit 133 to generate the last decompressed frame.

Step S606 is a step of transmitting the last decompressed frame generated in step S605 to the client 101 through the front-end interface 230. Thereafter, the data decompression program 312 is ended (S607).

The flows of the data compression program 311 and the data decompression program 312 have been described above. Hereinafter, three more specific examples of the flows in a case where the first compression technique is a standard codec and the second compression technique is deep video compression. However, the data compression program 311 and the data decompression program 312 are not limited to the examples to be described below.

Furthermore, two or more examples to be described below may be used in combination. For example, while key frames are encoded at regular intervals by intra-frame encoding, frames between the key frames may be encoded by inter-frame encoding. A frequency of performing the intra-frame encoding is, for example, for each predetermined number of frames, but may be any frequency such as a variable frequency.

Furthermore, all the frames may be encoded by intra-frame encoding. Furthermore, the inter-frame encoding is not limited to being based on a frame one before in terms of time, and for example, may be based on a frame two or more before in terms of time, may be a frame that is behind in terms of time but is already decompressed, or may be a combination thereof. Furthermore, intra-frame encoding and inter-frame encoding may be synchronized between the first compression technique and the second compression technique, or the frames may be encoded by independent methods.

Figure 7:
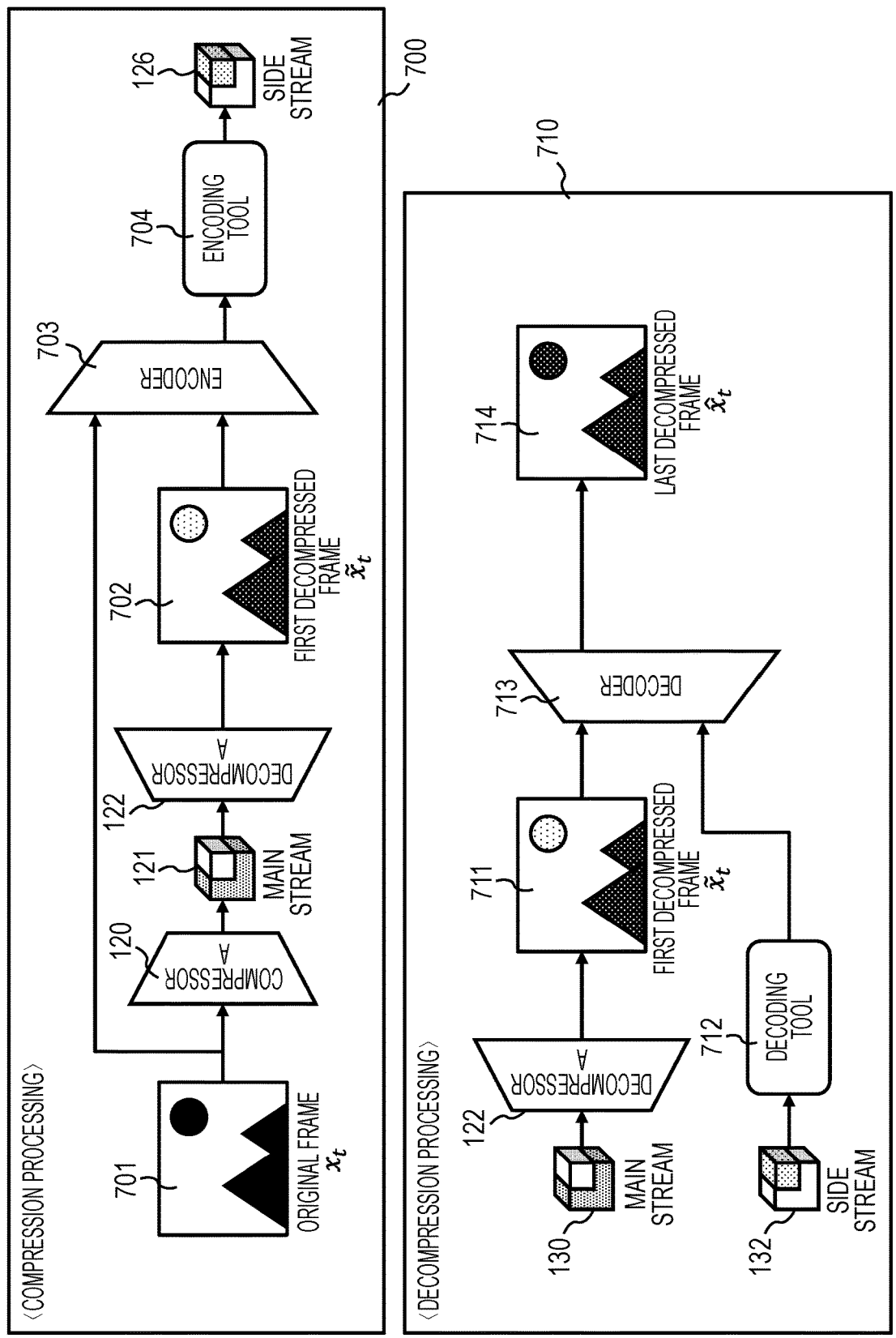
FIG. 7 is a block diagram of intra-frame encoding processing according to the first embodiment.

FIG. 7 illustrates an example of the intra-frame encoding of the moving image. Compression processing 700 is a block diagram illustrating compression processing of the intra-frame encoding. An original frame 701 generated by the data generation source 100 is input to the compressor A120 which is the compressor of the standard codec, and is compressed to the main stream 121. At this time, the bit consumption amount of the main stream 121 is smaller than the amount required to obtain a desired image quality by using only the standard codec. For example, as described above, the bit consumption amount may be reduced by increasing the QP of the standard codec in the entire frame, or the bit consumption amount may be selectively reduced in a region where the compression rate of the standard codec is worse than the compression rate of the deep video compression.

Subsequently, the main stream 121 is input to the decompressor A122 which is the decompressor of the standard codec to obtain a first decompressed frame 702. Thereafter, the original frame 701 and the first decompressed frame 702 are input to an encoder 703 constructed by the DNN.

The encoder 703 is, for example, a DNN including a convolution layer or a pooling layer that receives, as an input, a tensor of 6×height×width in which a tensor of an original frame having a size of 3×height×width and a tensor of the first decompressed frame 702 having the same size expressed in an RGB format are connected in a channel axis direction, and outputs a three-dimensional tensor.

An encoding tool 704 codes the tensor output from the encoder 703 into a bit array, and outputs the side stream 126. The encoding tool 704 may simply serialize a bit array of a floating point number expressing the tensor output by the encoder 703, or may estimate an occurrence probability of a value of each element of the tensor by using an entropy estimator such as an auto regressive model or a hyper prior network constructed by the DNN and may perform entropy encoding such as a range coder based on a result of the estimation in order to further improve a compression rate, or any other means may be used.

Note that the DNN included in the encoder 703 and the encoding tool 704 may be trained to allocate more bits particularly in a region where the compression rate of the deep video compression is better than the compression rate of the standard codec. An example of the learning processing will be described later. The encoder 703 and the encoding tool 704 constitute the second compression unit 123. The function of the image quality improvement information extractor 124 is included in the encoder 703, and the encoding tool 704 has a compression function.

Decompression processing 710 is a block diagram illustrating decompression processing of the intra-frame encoding. The main stream 130 is input to the decompressor A122 which is the decompressor of the standard codec, and is decompressed to a first decompressed frame 711. The side stream 132 is input to a decoding tool 712, and is decoded from the bit array into a format such as a tensor. Note that the decoding tool 712 is, for example, inverse conversion of the encoding tool 704, and in a case where entropy encoding is performed by the encoding tool 704, the decoding tool 712 performs decoding by using the same entropy model used by the encoding tool 704.

The decoded tensor and the first decompressed frame 711 are input to a decoder 713 to generate a last decompressed frame 714. The decoder 713 is, for example, a DNN including a transpose convolution layer or the like that receives, as an input, a tensor of the first decompressed frame 711 having a size of 3×height×width expressed in an RGB format and a tensor output from the decoding tool 712, and outputs the last decompressed frame 714 having a size of 3×height× width. The decoding tool 712 and the decoder 713 constitute the second decompression unit 133. The decoding tool 712 has a decompression function. The function of the frame generator 135 is included in the decoder 713.

Figure 8:
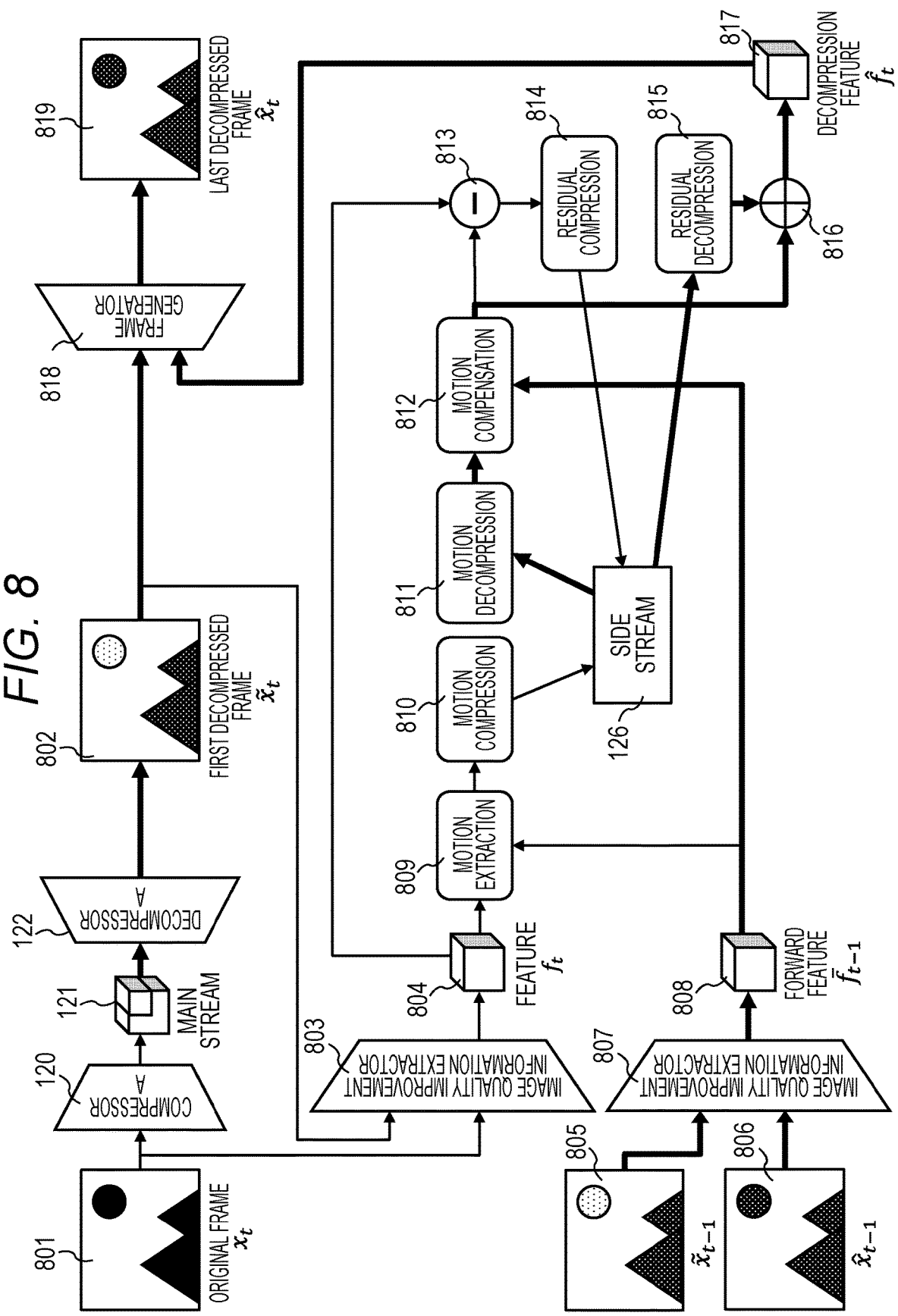
FIG. 8 is a block diagram of a first example of inter-frame encoding processing according to the first embodiment.

FIG. 8 illustrates a first example of the inter-frame encoding of the moving image. Among arrow lines connecting the blocks, a thick line represents a path required during decompression. During compression, paths of both a thin line and a thick line are used.

An original frame 801 generated by the data generation source 100 is compressed by the compressor A120 which is the compressor of the standard codec, is converted into the main stream 121, and then is converted into a first decompressed frame 802 by the decompressor A122 which is the decompressor of the standard codec. At this time, similarly to the intra-frame encoding, the bit consumption amount of the main stream 121 is suppressed.

Subsequently, the original frame 801 and the first decompressed frame 802 are converted into a feature 804 expressed in a format such as a tensor by an image quality improvement information extractor 803. The image quality improvement information extractor 803 is, for example, a DNN including a convolution layer, a pooling layer, and the like. For example, the image quality improvement information extractor 803 receives, as an input, a tensor of 6×height×width in which a tensor of the original frame 801 having a size of 3×height×width and a tensor of the first decompressed frame 802 having the same size expressed in an RGB format are connected in a channel axis direction, and outputs the feature 804 which is the three-dimensional tensor.

Subsequently, a first decompressed frame 805 and a last decompressed frame 806 of frames one before from the original frame 801 in terms of time are input to an image quality improvement information extractor 807, and a feature 808 (hereinafter, forward feature) in the frame one before is extracted.

Note that the image quality improvement information extractor 807 used at this time may be the same as or different from the image quality improvement information extractor 803. Furthermore, the image quality improvement information extractors 803 and 807 may not use the DNN, and may be, for example, processing of obtaining a difference between two input frames.

Furthermore, the first decompressed frame 805 and the last decompressed frame 806 are not limited to the frames one before from the original frame 801 in terms of time, and may be frames two or more frames before, or may be frames behind in terms of time but is already decompressed. The image quality improvement information extractor 807 can extract the forward feature from these frames.

Subsequently, the feature 804 and the forward feature 808 are input to motion extraction 809, and information necessary for motion compensation 812 at a subsequent stage is extracted. The motion extraction 809 may be, for example, a trained DNN that estimates an optical flow, may be a DNN that is trained in an end-to-end manner together with other DNNs included in FIG. 8, may be a motion vector predictor used in a standard codec or the like, or may be any other processing.

Motion compression 810 compresses an output of the motion extraction 809 into a bit array. The motion compression 810 converts, for example, a tensor output by the motion extraction 809 by a DNN including a convolutional layer, and codes a tensor obtained as a result by a range coder or the like by using an entropy estimator such as an auto regressive model constructed by the DNN. Note that the method of the motion compression 810 is not limited thereto.

An output of the motion compression 810 is decompressed by motion decompression 811 and then is input to the motion compensation 812 together with the forward feature 808. The motion compensation 812 is processing of correcting the forward feature 808 based on the information output by the motion decompression 811. The motion compensation 812 is, for example, a block that warps the forward feature 808 that is the three-dimensional tensor by offset information having the same width and height as the forward feature 808 output by the motion decompression 811 and having the number of channels of 2, but is not limited thereto.

Subsequently, a residual extractor 813 subtracts a tensor obtained as a result of the motion compensation 812 from the feature 804 for each element and outputs residual information. However, the residual extractor 813 is not limited thereto, and may be a DNN or the like. The residual information is compressed into a bit array by residual compression 814. The residual compression 814 may use a technique similar to motion compression 810, or any other compression technique.

The side stream 126 has a data structure including the bit array generated by the motion compression 810 and the bit array generated by the residual compression 814. The bit array generated by the residual compression 814 is decompressed by residual expansion 815 and then is input to a residual compensator 816 together with an output of the motion compensation 812. The residual compensator 816 is, for example, processing of outputting a tensor 817 (hereinafter, decompressed feature) obtained by adding an output of the residual expansion 815 to the output of the motion compensation 812 for each element, but is not limited thereto.

Finally, the first decompressed frame 802 and the decompressed feature 817 are input to a frame generator 818 to obtain a last decompressed frame 819. The frame generator 818 is a DNN including a transposed convolution layer or the like, but is not limited thereto.

Note that, although the example in which the motion extraction 809 and the motion compensation 812 are performed by using the decompressed first decompressed frame 805 and the last decompressed frame 806 has been described above, the present invention is not limited thereto. For example, the decompressed feature 817 that has been decompressed may be buffered and used as the forward feature 808.

Figure 9:
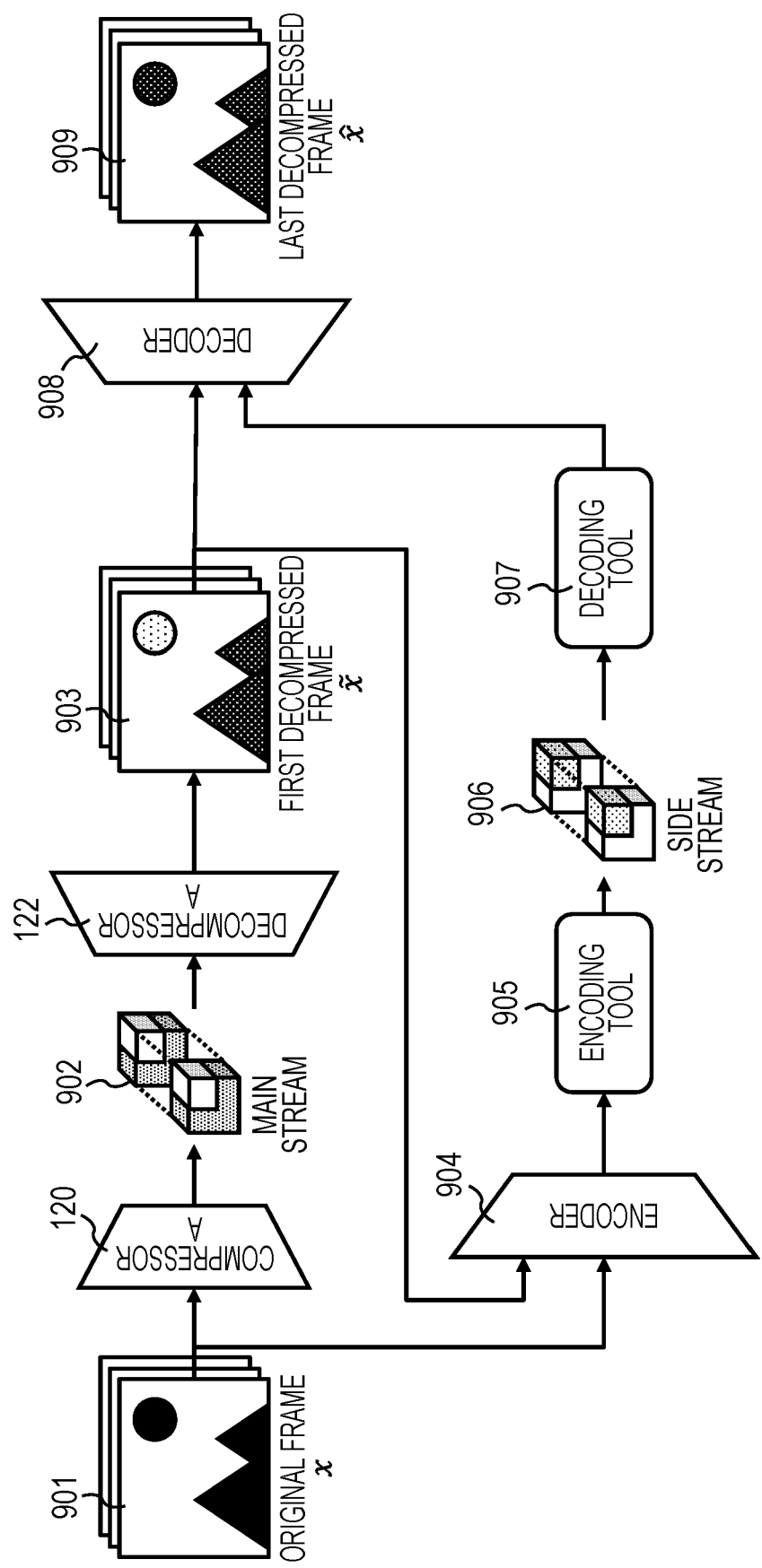
FIG. 9 is a block diagram of a second example of the inter-frame encoding processing according to the first embodiment.

FIG. 9 illustrates a second example of the inter-frame encoding. First, the compression processing will be described. An original frame 901 including a plurality of frames is input to the compressor A120 which is the compressor of the standard codec to obtain a main stream 902, and then a first decompressed frame 903 including a plurality of frames is obtained by the decompressor A122.

Subsequently, the original frame 901 and the first decompressed frame 903 are simultaneously input to an encoder 904 for a plurality of frames. The encoder 904 is, for example, a DNN including a two-dimensional convolution layer or the like that receives, as an input, a tensor of 6N×height×width in which the original frame 901 and the first decompressed frame having a size of 3×height×width expressed in an RGB format for N frames are connected in a channel axis direction, and outputs a three-dimensional tensor.

Furthermore, the encoder 904 may be processing of receiving, as an input, a tensor of 6×N×height×width in which the original frame 901 and the first decompressed frame having a size of 3×height×width expressed in an RGB format for N frames are connected in a channel axial direction and a frame axis direction and converting the tensor into a tensor by a DNN including a three-dimensional convolution layer or the like, or may be any other processing.

An encoding tool 905 converts data such as a tensor generated by the encoder 904 into a bit array to generate a side stream 906. The encoding tool 905 is, for example, processing of encoding the tensor output from the encoder 904 with a range coder or the like by using an entropy estimator of an auto regressive model constructed by a DNN, but is not limited thereto.

Subsequently, decompression processing will be described. The decompressor A122 outputs a first decompressed frame 903 from the main stream 902. Furthermore, a decoding tool 907 decodes the side stream 906 into data such as a tensor. Finally, the first decompressed frame 903 and an output of the decoding tool 907 are input to a decoder 908 to obtain a last decompressed frame 909 for a plurality of frames.

The decoder 908 is, for example, a DNN including a two-dimensional transposed convolution layer or the like that outputs the last decompressed frame 909 for N frames by outputting a tensor having a size of 3N×height×width. Furthermore, the decoder 908 may be a DNN including a three-dimensional convolution layer that receives, as inputs, a plurality of three-dimensional tensors and outputs a plurality of tensors having a size of 3×height×width, or may be any other processing.

(1-6) DNN Learning Processing

Figure 10:
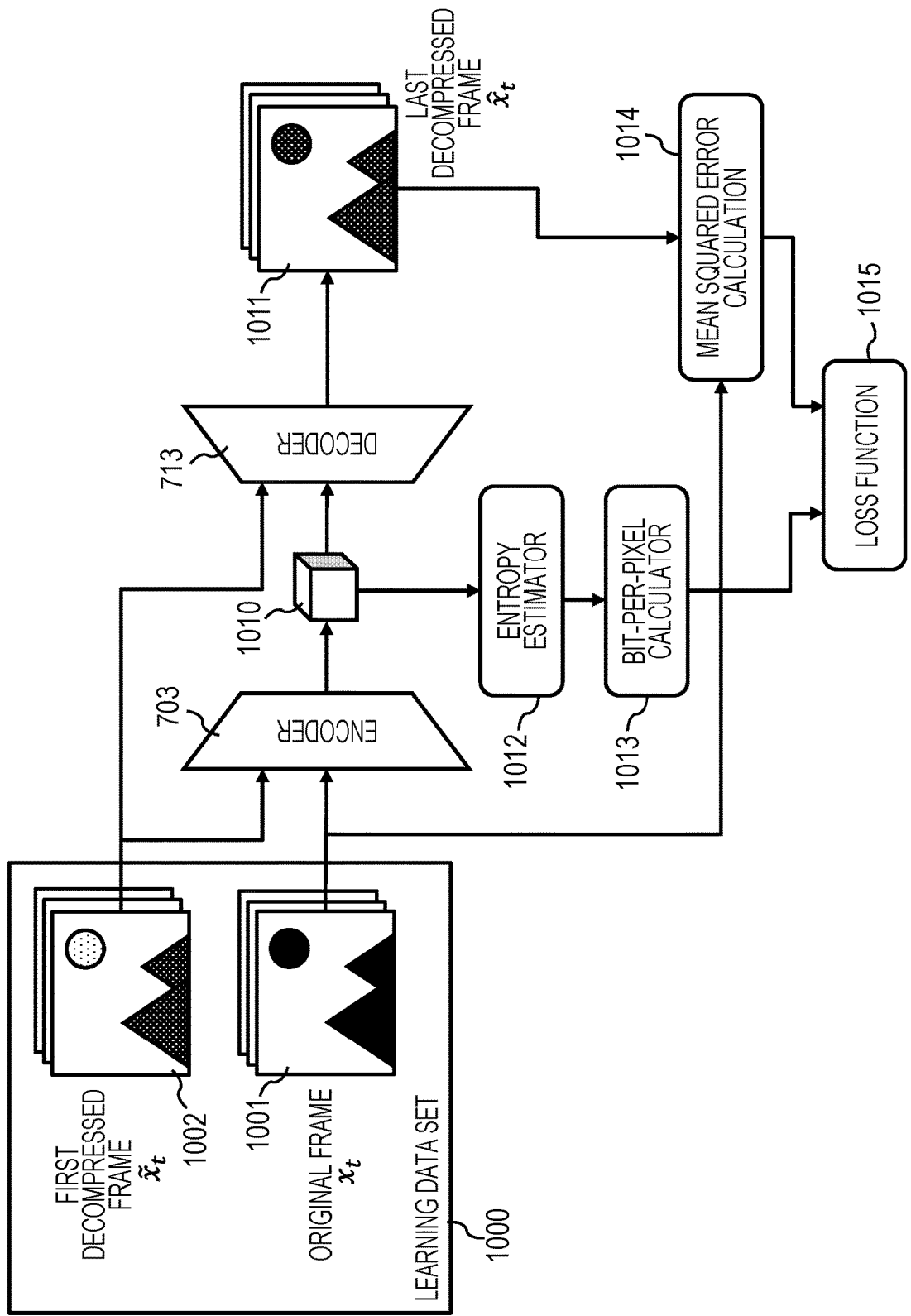
FIG. 10 is a block diagram of learning processing according to the first embodiment.

FIG. 10 illustrates an outline of the learning program 313 of the DNN. Hereinafter, an outline of learning will be described by using the intra-frame encoding illustrated in FIG. 7 as an example, but DNNs can be trained by a similar method also for the inter-frame encoding illustrated in FIGS. 8 and 9. Note that the method for training the DNN is not limited to the method to be described below, and any learning data, optimizer, a loss function, or the like may be used.

A learning data set 1000 is data used for training the DNN. An original frame 1001 is data including a frame of a moving image before compression. A first decompressed frame 1002 is a frame obtained by compressing and decompressing the original frame 1001 by intra-frame encoding of the standard codec.

A learning flow of the DNN will be described. First, the original frame 1001 corresponding to a batch size used for learning and the first decompressed frame 1002 corresponding thereto are acquired from the learning data set 1000. Subsequently, the original frame 1001 and the first decompressed frame 1002 are input to the encoder 703, and a feature 1010 such as a tensor is output.

In a case where an output of the encoder 703 includes processing of quantizing a value of the feature 1010 into an integer or the like, a change such as adding noise to a tensor instead of quantization may be performed during learning such that an error back-propagation method is enabled. In addition, a generally known approximation technique of quantization that enables an error back-propagation method may be used. Subsequently, the feature 1010 and the first decompressed frame 1002 are input to the decoder 713 to acquire a last decompressed frame 1011.

Subsequently, an image quality between the acquired last decompressed frame 1011 and the original frame 1001 is quantified with a mean squared error (MSE) 1014 or the like. Note that an index of the image quality is not limited to the MSE, and may be any index such as an L1 norm or multi-scale structural similarity. In a case where the encoding tool 704 that entropy-codes the feature 1010 is used, an occurrence probability of a value of each element of the feature 1010 is estimated by an entropy estimator 1012 such as an auto regressive model configured by a DNN.

Subsequently, a bit-per-pixel (bpp) calculator 1013 calculates a bit consumption amount after the encoding of the feature 1010 based on an estimation result of the entropy estimator 1012. Note that bpp is an index representing a bit consumption amount per pixel. The bpp calculated in the bpp calculator 1013 and the MSE calculated in the MSE 1014 are input to a loss function 1015, and a loss value of learning is calculated.

Thereafter, based on the value of the loss function, learning parameters of the DNNs included in the encoder 703, the decoder 713, the entropy estimator 1012, and the like are updated by using an error back-propagation method or the like. Note that an input of the loss function 1015 is not limited to the calculated bpp and MSE, and regularization such as weight decay may be reflected in learning by using, as an input, the learning parameter of the DNN. Furthermore, in a case where the entropy estimator 1012 is a hyperprior network, bpp of a hyperprior may be similarly estimated and used as an input of the loss function 1015.

The loss function 1015 is, for example, a function (L=MSE+a×bpp) that linearly combines bpp and MSE with a hyperparameter a. The hyperparameter a is a parameter for adjusting a bit consumption amount of the side stream 126.

Furthermore, the following Equation (1) may be used as the loss function 1015.

[Math. 1]

$$\mathcal{L} = \frac{bpp_{main} + bpp_{side}}{\text{rate}_x(MSE_{\hat{x}})} \times 100 \tag{1}$$

By using Equation (1), the DNN can be trained such that a reduction rate of the bit consumption amount of the present embodiment with respect to the standard codec is maximized without adjusting the hyperparameter a. Equation (1) is an equation in which a ratio of the bit consumption amount to the bit consumption amount of the standard codec in the image quality of the last decompressed frame 1011 is represented by 100 fractions.

Figure 11:
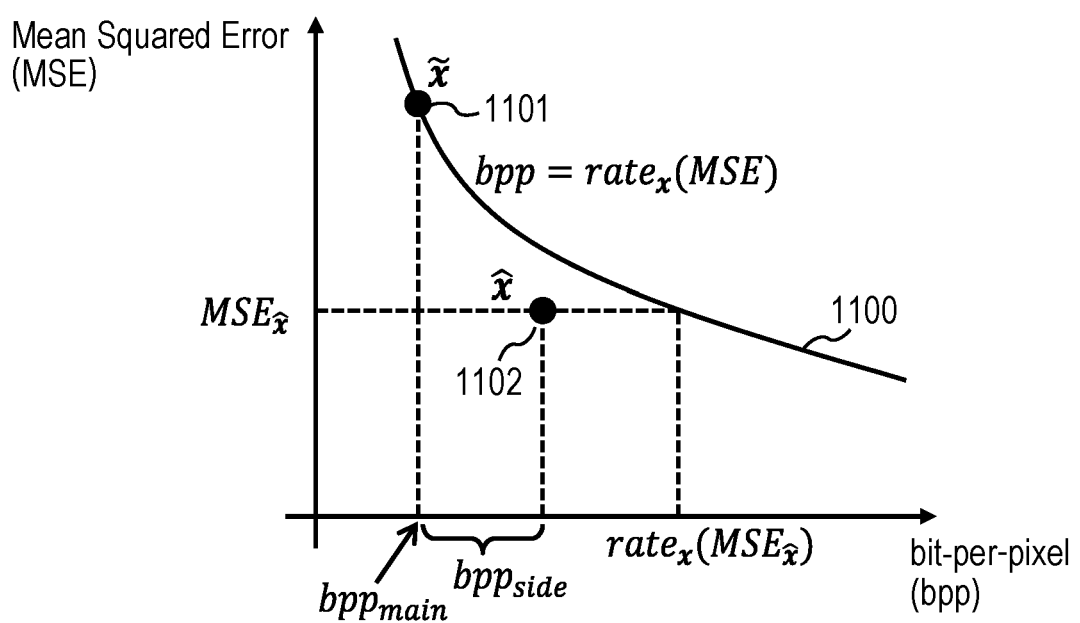
FIG. 11 is an outline of an example of a loss function according to the first embodiment.

Equation (1) will be described with reference to FIG. 11. A curve 1100 represents a rate distortion curve of the standard codec in a learning batch x. A function rate_x (mse) is a function representing the curve 1100, and is a function that returns the bit consumption amount of the main stream 126 when the frame is compressed and decompressed by the standard codec such that the image quality of the learning batch x becomes mse. This function can be obtained by interpolation with a quartic function or the like from actual measurement values of the image quality and the bit consumption amount when the original frame 1001 of the learning batch x is compressed by a plurality of QPs, but is not limited thereto.

Furthermore, the actual measurement values of the image quality and the bit consumption amount for each QP required in the interpolation processing may be included in the learning data set 1000. A point 1101 is a point when the original frame 1001 is compressed and decompressed into the first decompressed frame 1002 by the standard codec, and bpp thereof is set to bpp_main. A point 1102 is a point when the original frame 1001 is compressed and decompressed according to the present embodiment, and the image quality thereof is set to mse_xhat.

Assuming that the bit consumption amount of the side stream 126 is bpp_side, the bit consumption amount of the present embodiment is bpp_main+bpp_side, and corresponds to a numerator of Equation (1). The bit consumption amount when the original frame 1001 is compressed and decompressed by the standard codec and the image quality is set to mse_xhat can be estimated as rate_x (mse_xhat), and corresponds to a denominator of Equation (1).

That is, when the image quality is equivalent by using Equation (1) as the loss function 1015, the DNN can be trained to have the bit consumption amount of the side stream 126 such that the ratio of the bit consumption amount of the present embodiment to the standard codec becomes minimum. Note that the loss function 1015 is not limited to the function described above, and may be another function.

Note that the present invention is not limited to the aforementioned embodiment, and includes various modification examples. For example, the aforementioned embodiment is described in detail in order to facilitate easy understanding of the present invention, and is not limited to necessarily include all the described components. Furthermore, some of the components of a certain embodiment can be substituted into the components of another embodiment, and the components of another embodiment can be added to the component of a certain embodiment. Furthermore, another component can be added, removed, and substituted to, from, and into some of the components of the aforementioned embodiment.

Furthermore, a part or all of the aforementioned configurations, functions, and processing units may be realized by hardware by designing an integrated circuit, for example. Furthermore, each of the aforementioned configurations and functions may be realized by software by interpreting and executing a program that realizes each function by the processor. Information of programs, tables, and files for realizing the functions can be stored in a recording device such as a memory, a hard disk, or a solid state drive (SSD), or a recording medium such as an IC card, or an SD card.

Furthermore, control lines and information lines illustrate lines which are considered to be necessary for the description, and not all the control lines and information lines in a product are necessarily illustrated. Almost all the configurations may be considered to be actually connected to each other.

What is claimed is:

1. A data compression system comprising:
   one or more processors; and
   one or more storage devices, wherein
   the one or more processors are configured to
   receive original data from a data generation source, wherein the original data is image data,
   compress the original data by a first lossy compression method to generate first compressed data,
   decompress the first compressed data to generate first decompressed data,
   extract residual information between the original data and the first decompressed data,
   compress the residual information by a second lossy compression method different from the first lossy compression method to generate second compressed data, wherein the second lossy compression method includes one or more parameters set by a compression parameter setter to control a bit consumption amount in each frame of the original data to improve image quality of each frame of the original data,
   store the first compressed data and the second compressed data in the one or more storage devices,
   receive a request for the first compressed data and the second compressed data from a client device,
   retrieve the first compressed data and the second compressed data from the one or more storage devices, and
   provide the first compressed data and the second compressed data to the client device.

2. The data compression system according to claim 1, wherein
   the first compressed data and the second compressed data are associated with each other, and are stored as compressed data of the original data in the one or more storage devices.

3. The data compression system according to claim 1, wherein
   one of the first lossy compression method or the second lossy compression method executes compression using a neural network, and the other of the first lossy compression method or the second lossy compression method executes compression without using a neural network.

4. The data compression system according to claim 1, wherein
   the compression parameter setter is configured to
   reduce a bit consumption amount of the first lossy compression method, and increase a consumed bit of the second lossy compression method in a portion where a compression rate of the second lossy compression method is better than a compression rate of the first lossy compression method to improve an image quality.

5. The data compression system according to claim 4, wherein
   the compression parameter setter is configured to
   reduce the bit consumption amount by the first lossy compression method in a portion where the compression rate of the first lossy compression method is worse than the compression rate of the second lossy compression method.

6. The data compression system according to claim 1, wherein
   the second lossy compression method uses a neural network, and
   the neural network is trained such that a reduction rate of a bit consumption amount with respect to the first lossy compression method is increased.

7. The data compression system according to claim 6, wherein the one or more parameters are a trained parameter of the neural network.

8. The data compression system according to claim 1, wherein
   the one or more processors are configured to
   extract the residual information by a neural network.

9. The data compression system according to claim 1, wherein
   the original data is moving image data.

10. The data compression system according to claim 9, wherein
    the second lossy compression method executes at least one of intra-frame coding and inter-frame coding by using a neural network.

11. A data compression method by a data compression system, comprising:
    receiving original data from a data generation source, wherein the original data is image data,
    compressing the original data by a first lossy compression method to generate first compressed data;
    decompressing the first compressed data to generate first decompressed data;
    extracting residual information between the original data and the first decompressed data;
    compressing the residual information by a second lossy compression method different from the first lossy compression method to generate second compressed data, wherein the second lossy compression method includes one or more parameters set by a compression parameter setter to control a bit consumption amount in each frame of the original data to improve image quality of each frame of the original data;
    storing the first compressed data and the second compressed data in a storage;
    receiving a request for the first compressed data and the second compressed data from a client device;
    retrieving the first compressed data and the second compressed data from the storage; and
    providing the first compressed data and the second compressed data to the client device.

12. The data compression method according to claim 11, wherein
    the second lossy compression method uses a neural network, and
    the neural network is trained such that a reduction rate of a bit consumption amount with respect to the first lossy compression method is increased.

13. The data compression method according to claim 12, wherein the one or more parameters are a trained parameter of the neural network.

* * * * *